UNITED STATES PATENT OFFICE.

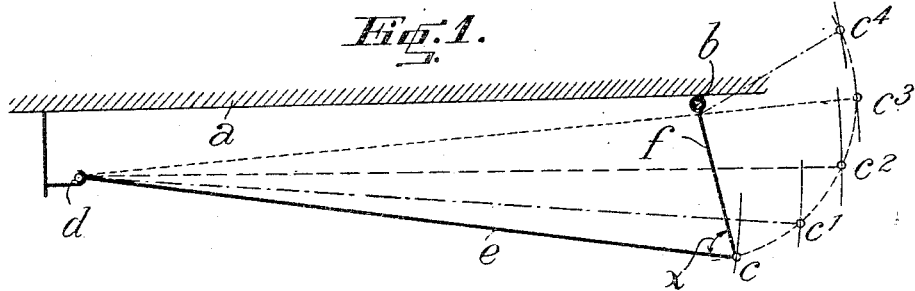
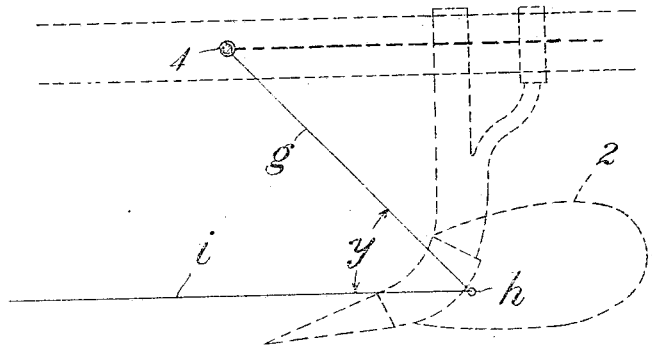
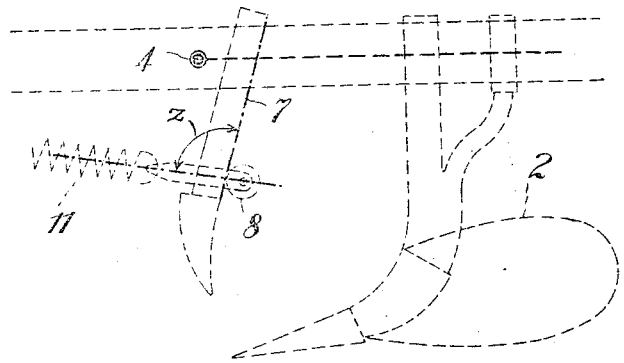

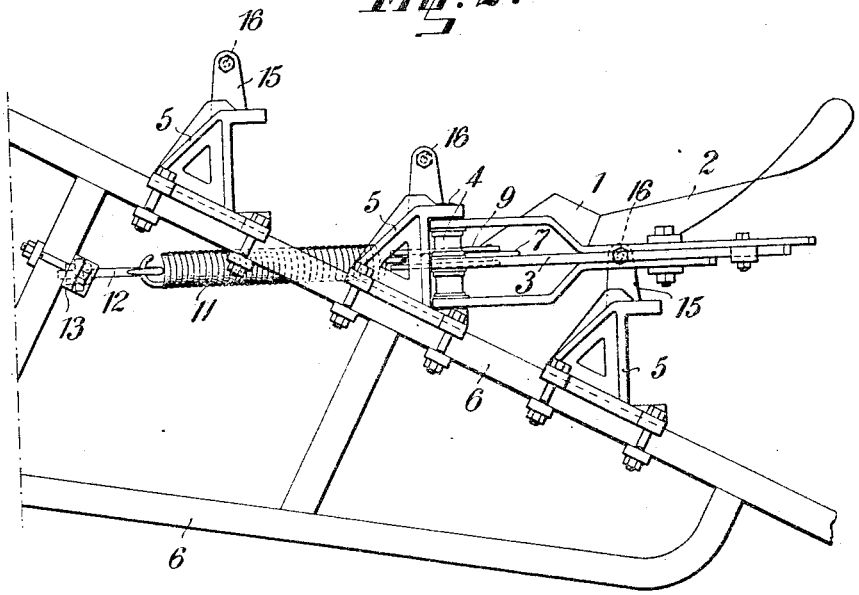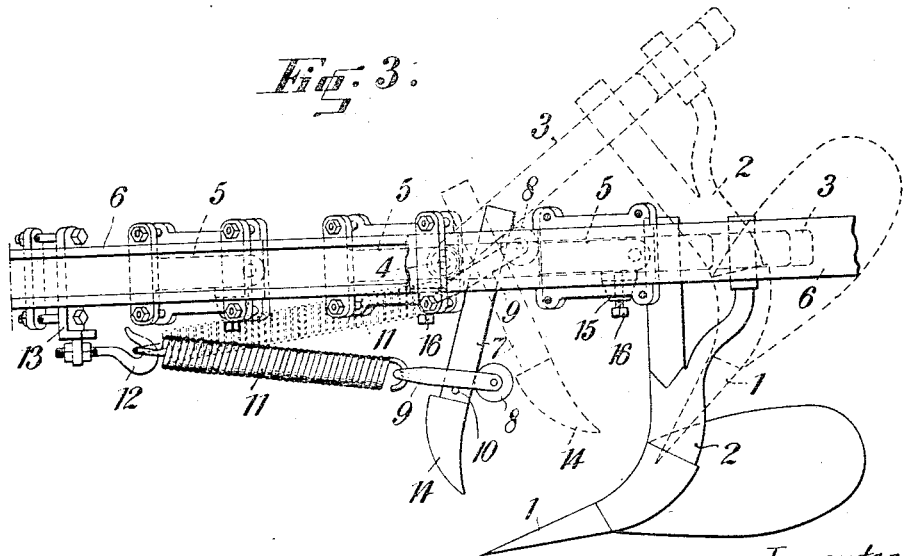

CARL GLEICHE, OF BERLIN, GERMANY, ASSIGNOR TO STOCK MOTORPLUG GESELLSCHAFT MIT BESCHRÄNKTER HAFTUNG, OF BERLIN, GERMANY, A CORPORATION OF GERMANY.

PLOWING-TOOL.

1,287,960.  Specification of Letters Patent.  Patented Dec. 17, 1918.

Application filed October 17, 1914. Serial No. 867,087.

*To all whom it may concern:*

Be it known that I, CARL GLEICHE, a citizen of the German Empire, and resident of Berlin, Germany, have invented certain new and useful Improvements in Plowing-Tools, of which the following is a specification.

My invention relates to the arrangement of spring loaded plowing tools pivoted to plow frames, as used more particularly in connection with motor plows. The use of such tools is adapted to prevent breakage of the machine and damage to the shares, the latter being able to swing up when they strike an obstacle offering excessive resistance, such as a block of stone or the like.

Such plow tools are usually arranged so that they are automatically returned by their springs to their normal working position after passing the obstacle. With the arrangements hitherto adopted, when the plowing implement yields to an obstacle the tensioning of the spring increases at a progressive rate, and if the obstacle is particularly heavy or large, such as the root of a tree or the like, the implement is liable to engage it with the full force of its spring and become as it were hooked to the obstacle, with the result that it fails to slide over the same, the plow having to be reversed for a short distance, to enable the obstacle to be removed.

The object of my invention is to remove this disadvantage, and to this end I so arrange the parts that the rate at which the tension of the spring increases is reduced in the course of the movement of the implement from its working position. Although the tension of the spring increases as the implement swings up, the rate of increase is so reduced in the latter stages of the movement that the implement cannot possibly hook into the obstacle and remain engaged therewith. Various means for attaining this object may be adopted. An essential feature is however that the angle made by the axis of the spring and the line drawn from the point of attachment of such spring to the pivot of the implement is, when the implement is in its operative position, less than 90°, and decreases as the implement swings away from its operative position.

My invention is illustrated in the accompanying drawings, in which—

Figure 1 is a diagram illustrating the action.

Figs. 2 and 3 are a plan and side view respectively of a practical embodiment of the arrangement of the plowing implements, a part of the motor plow frame being also shown, and Figs. 4 and 5 are diagrams which will be explained hereinafter.

Referring to Fig. 1, $a$ denotes the plow frame, $b$ the pivot of the plowing implement (not shown), $c$ the attachment of the spring $e$ to the plowing implement, the spring being pivoted to the frame at $d$, and $f$ the line connecting $b$ to $c$. The full lines $e$, $f$ denote the position of the parts when the implement is operative. When the plowing implement swings up about its pivot $b$ the rate of increase of tension of the spring $e$ becomes less in proportion as the implement moves; this will be clear from consideration of the change in the length of the spring as the point $c$ moves through the equal arcs $c,-c^1$, $c^1-c^2$, $c^2-c^3$.

This is due to the fact that the angle $x$ between $e$ and $f$ with the plowing implement in its original or operative position, is less than 90° as shown in Fig. 1.

In the practical embodiment of the invention as shown in Figs. 2 and 3, the selection of position and shape of the plowing implements is such that on the one hand the latter is able to readily swing back to its original position into the soil, the tension imparted to the spring being fully adequate for this purpose, though the rate of increase of tension decreases, while on the other hand the rate of increase of the spring tension is still further reduced by special means, additional to the adoption of a certain angle between the implement and the spring. The plow body 2 carrying the share 1 is suspended on a normally horizontal lever 3, which is pivoted at 4, some distance toward the front of the machine. The pivot pin 4 is disposed in a bracket 5 which is bolted to the plow frame 6.

Fixed to the lever 3, close behind the pin 4, is a forwardly inclined bar 7, on the rear surface of which a roller 8 can roll. The roller 8 is carried by a lug 9, the downward movement of which is limited by a stop 10. The lug 9 has attached thereto one end of a strong coiled spring 11, the other end of which is secured loosely or pivotally to a hook 12 screwed into a bracket 13 fixed to the frame 6. The bar 7 carries at its lower end a knife 14 disposed in front of the main share and serving as a colter or similar tool. Each bracket 5 is provided at the side remote from the frame 6 with an arm 15 provided with a set screw 16 on which rests the lever 3 of the plowing tool 2 lying in front of this bracket 5. With the plowing tool 2 in the operative position indicated by full lines in Fig. 3, the angle $x$ is smaller than 90° the sides of this angle passing from the point of connection of the spring 11 to the plowing implement, i. e., from the point of contact of roller 8 and bar 7, through the spring 11 and to the pivot 4. If the plowing implement 2 while in operation strikes a heavy obstacle, which it is incapable of lifting out of the way, said implement swings back about its pivot 4, stretching the spring 11, and assumes the position indicated by broken lines in Fig. 3, in which position the bar 7 is inclined rearward. In this case the angle $x$ becomes constantly smaller as described hereinbefore with reference to Fig. 1, and the rate at which the spring 11 is extended decreases in proportion as the plowing implement swings back.

If an angle very much less than 90° were adopted, the point of attachment of the spring to the plowing implement would pass beyond the position in which the spring is fully stretched, that is to say the position in which the angle $x$ has the value $nil$.

In this case the spring tension would be reduced again, which would be contrary to the object in view. This is prevented, according to my invention, by arranging that the spring 11 or its lug 9 abuts against the pin 4 when the angle $x$ is nearly $nil$, so that not only is a reduction of tension avoided but a further, though small, increase in spring tension is obtained. The conditions which obtain will be readily understood by observing in Fig. 1 the line connecting the pivot $b$ with the point $c^4$ disposed beyond the position of fullest stretch of the spring. That is, the pivot 4 forms a stop in the path of the spring 11 (or of a part, such as the lug 9, moving with said spring), to cause the spring to bend when it approaches a position in which its longitudinal axis $d, c$ would pass through the pivot $b$.

According to my invention, the plowing implement is of such a shape and is so mounted that it can readily be returned to its original position in the soil. This is effected by reducing the angle made by the connecting line $g$ (Fig. 4) between the pivot 4 of the plowing implement and the point of application $h$ of the horizontal component of the resistance offered by the soil, and the horizontal line $i$ passing through the point $h$. The reduction of this angle $y$ is favorable to this object for two reasons: firstly, with a very acute angle $y$ the plowing implement has the tendency to enter the soil of its own accord, and secondly the smaller the angle $y$ the smaller is the angular movement through which the implement has to be moved about its pivot 4 to place it in its inoperative position. By adopting an angle $y$ considerably less than 90° (the most efficient angle being not more than 60°) the spring 11 will only require to exert comparatively very little power to return the plowing implement 2 to its operative position, for the above mentioned reasons.

The result is that it is possible to still further reduce the rate of increase of tension of the spring 11, that is to say to effect a reduction additional to that obtained by the described position of the pivot of the implement and spring 11. This is effected by the roller 8 running up the back of the bar 7 and thereby coming closer to the pivot 4, while said bar 7 is moving into the position indicated in Fig. 3 by broken lines. This occurs as soon as the original obtuse angle $z$ (see diagram in Fig. 5) between the bar 7 and the axis of the spring 11 has become slightly smaller than 90° by reason of the roller, under the action of spring 11, rolling up the bar 7. With this arrangement it is possible by altering the inclination of the bar 7, to almost completely eliminate the increase of tension of the spring 11, so that when the plowing implement is in its raised position the spring is only very slightly more tensioned than before, and the implement cannot be caught fast to a root or the like, although its tension will suffice to return it to its operative position as soon as it has passed over the obstacle. The guide bar 7 for the roller 8 is intentionally arranged behind the pivot 4, i. e., on that side of the pivot remote from the point of connection 12 of spring 11 to the plow frame, so that even when the spring 11 has passed its fully stretched position, in which the angle $x$ has the value $nil$, the tension of the spring increases by reason of the latter, or its lug, passing around the pivot pin 4.

The arrangement of the knife 14 on the lower end of the bar 7 is advantageous in some cases, inasmuch as it enables special holding devices for colters and similar tools, such as those used for loosening the soil and cutting turf, to be dispensed with.

The support of each plowing implement 2 is disposed comparatively far behind the pivot 4 and it is supported by the set screw 16 in the arm 15 of the bracket 5 for the following plowing implement, said screw 16 providing a ready means for adjusting the angle of inclination and the depth of engagement of the implement 2, in the soil, so that each implement can be separately adjusted. This is an important feature in connection with plows having a plurality of shares, especially for motor plows, where the several implements should work uniformly.

The tension of the spring 11 can be adjusted according to the nature of the soil by adjusting the nuts on the shank of the hook 12. For this purpose a chain may be introduced in front of or behind the spring 11, i. e., between this spring 11 and the lug 9 or the bar 12, said chain providing a further means for adjusting the tension of the spring 11, by taking out or inserting links.

I claim:

1. A plow frame, a plow share carried thereby, a guide bar mounted to swing relatively to the plow frame, a plow implement secured to the lower end of said guide bar and arranged in front of the plow share, a spring the front end of which is secured to the frame, and means connected with the rear end of the spring and arranged to travel along said guide bar.

2. In a machine of the character described, a frame, a soil-working implement pivoted to said frame, a track member connected with said implement, and a coiled spring one end of which is pivotally connected with said frame while its other end is arranged to travel in and out lengthwise of said track member, the angle between the longitudinal axis of the spring and the radius from the pivot to the point of contact of the spring with said track, being less than 90°.

3. In a machine of the character described, a frame, a soil-working implement pivoted to said frame, a track connected with said implement, and a coiled spring the one end of which is connected with the frame on the side of the pivot opposite to the direction in which said implement swings when yielding, while the other end of the spring is arranged to travel in and out lengthwise of said track.

4. In a machine of the character described, a frame, a soil-working implement pivoted to said frame, a bar formed with a track and connected with said implement and extending in a direction transverse to a line connecting said pivot with the soil-engaging portion of the implement, the track of said bar facing said soil-engaging portion, and away from the pivot, a coiled spring one end of which is connected with the frame in advance of the pivot, and means connected with the other end of the spring and arranged to travel along said track.

5. In a machine of the character described, a frame, a soil-working implement pivoted to said frame, a bar formed with a track and connected with said implement and located in advance thereof, a soil-working member carried by the said bar, a coiled spring the forward end of which is connected with the frame, and means connected with the rear end of the spring and arranged to travel along said track bar.

6. In a machine of the character described, a frame, a plurality of brackets secured thereto and formed with supports, and soil-working implements each pivoted to one of said brackets and arranged to engage, and be supported by, the support of the bracket to which an adjacent implement is pivoted.

7. In a machine of the character described, a frame, a plurality of brackets secured thereto and provided with supports adjustable up and down relatively to the respective brackets, and soil-working implements each pivoted, to swing up and down, to one of said brackets, and adapted to engage, and be supported by, the adjustable support of the bracket to which an adjacent implement is pivoted.

8. In a machine of the character described, a frame, a soil-working implement pivoted thereto, means movable lengthwise of said implement, and a coiled spring one end of which is connected with said frame and the other with the said means, the pivot of said implement being arranged in the path of the means so as to form a stop which will prevent the said means and the main portion of the spring from passing beyond said pivot.

9. In a machine of the character described, a frame, a soil-working implement pivoted thereto, a coiled spring the forward end of which is connected with the frame, and a track bar connected with said implement, means secured to the other end of the spring in engagement with said track bar, and adapted to travel lengthwise thereof, said track bar forming an obtuse angle with the longitudinal axis of the spring, and said axis forming an acute angle with the radius from the pivot to the point of contact with the said bar.

In testimony whereof, I have signed this specification in the presence of two subscribing witnesses.

CARL GLEICHE.

Witnesses:
HERMANN SCRINI,
HUGO KAPITZKE.

Copies of this patent may be obtained for five cents each, by addressing the "Commissioner of Patents, Washington, D. C."